Patented Apr. 21, 1931

1,801,741

UNITED STATES PATENT OFFICE

ALEXANDER HASSELBACH, OF DESSAU, GERMANY, ASSIGNOR TO THE FIRM G. POLYSIUS, AKTIENGESELLSCHAFT, OF DESSAU, GERMANY

METHOD OF REDUCING GYPSUM

No Drawing. Application filed February 9, 1929, Serial No. 338,879, and in Germany September 6, 1927.

The present practice of working gypsum into sulphuric acid and cement is objectionable by reason of the forming during burning of sulphid of calcium (CaS). The formation of sulphid of calcium is due to the fact that the material to be reduced is merely mixed in dry condition with the reducing agent thus causing the reduction to take place too quickly, the oxygen of the air being able to form a compound with the reducing agent, such as for instance with the carbon, from the very start of the process. The reducing agent ordinarily has been prematurely exposed to the action of the oxygen, which must be considered as an essential disadvantage. In consequence of this in the presence of sulphid of calcium the gypsum could be easily caused to melt. This, however, is unfavorable for the further proper course of the process of reduction because cakes or the like may easily form at the walls of the rotary furnace.

It has further been proposed, in order to make cement or hydraulic lime by heating gypsum or anhydrite together with clay, to turn the mass into briquettes prior to introducing the same into the furnace. In this case sulphurous acid is produced as a by-product. This process of forming briquettes, however, has been limited to shaft furnaces. According to the present state of the art, therefore, a preliminary transformation of the mass or mixture has not been used to prepare said mass prior to introducing the same into the rotary furnace. As a matter of fact, according to the present practice, when using a rotary furnace, the mass or the mixture had to be supplied to said furnace in the form of a powderous material, such as a meal, or of muddy consistency.

In connection with processes of making Portland cement it is further known to cause the charge of the furnace which consists of raw materials in powderous form to ball up into small crumbs.

My present invention takes advantage of the aforeindicated known processes and results in a process of reducing gypsum or the like in the rotary furnace which has heretofore not been possible.

Essentially the novel process according to my invention consists therein that the mixture which may, for instance, consist of gypsum, clay and carbon is transformed into granules and burnt in a rotary furnace in this condition. In this manner the formation of sulphid of calcium will be safely prevented during the course of the reduction proper. By transforming said mixture into a mass of granular consistency as above indicated, the reducing agent which is embedded in the granules will be prevented from being prematurely exposed to the action of the oxygen of the air so that this reducing agent will fully come to action during the entire process of reduction. On account of the fact that during the process according to my invention there will not be formed any sulphid of calcium a further advantage will result viz: that a partial melting and consequent caking of the material at the wall of the furnace will be positively avoided.

The specific method by which the mixture is formed into granules constitutes no part of the present invention, the mixture being treated in any known manner, for instance by the process described in the U. S. patents to Rodman No. 1,239,221, September 4, 1927 or Schulze No. 1,656,572, January 17, 1928.

When carrying out the process according to my invention, preferably a greater quantity of reducing agents than would correspond to theoretical considerations is added to the material to be reduced at the very start of the process. In this case also the fact must be considered that a large part of the reducing agent, which adheres to the surface of the granules will undergo combustion before the granules pass into the reduction zone. If, however, a greater quantity of reducing agents is added at the start of the process, the disadvantage of a premature removal of the reducing agent due to combustion will be avoided. Adding a greater quantity of reducing agents than necessary for carrying through the process of reduction has likewise been impossible in connection with the heretofore used processes of reducing gypsum, because the essential part of the reducing agent could not be protected against the action of the oxygen.

I claim:

In the art of reducing gypsum by burning a mixture of gypsum, clay, and carbon, the process of preventing the formation of calcium sulphide which consists in forming the mixture into granules with an excess of carbon to compensate for the initial combustion of that portion of the carbon in the surface of the granules, and burning the granules thus formed in a rotary kiln.

In testimony whereof I affix my signature.

ALEXANDER HASSELBACH.